(12) United States Patent
Patil et al.

(10) Patent No.: US 12,430,287 B1
(45) Date of Patent: Sep. 30, 2025

(54) ADAPTIVE SAMPLING FOR DATA SUMMARIZATION

(71) Applicant: NetApp, Inc., San Jose, CA (US)

(72) Inventors: Parag Patil, Maharashtra (IN); Sonika Shantilal Gautami, Gujarat (IN); Darshini Parikh, Gujarat (IN)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/899,094

(22) Filed: Sep. 27, 2024

(51) Int. Cl.
*G06F 16/00* (2019.01)
*G06F 16/11* (2019.01)
*G06F 16/9035* (2019.01)
*G06F 21/56* (2013.01)

(52) U.S. Cl.
CPC ........ *G06F 16/122* (2019.01); *G06F 16/9035* (2019.01); *G06F 21/566* (2013.01)

(58) Field of Classification Search
CPC .................................................. G06F 16/9035
See application file for complete search history.

(56) References Cited

U.S. PATENT DOCUMENTS

| | | | |
|---|---|---|---|
| 9,338,218 B1 | 5/2016 | Florissi et al. | |
| 10,122,783 B2 | 11/2018 | Qiao et al. | |
| 10,169,083 B1 | 1/2019 | Florissi et al. | |
| 10,572,296 B2 | 2/2020 | Haughwout et al. | |
| 11,243,861 B2 | 2/2022 | Larkin et al. | |
| 11,243,966 B1 | 2/2022 | Wong | |
| 11,625,381 B2 | 4/2023 | Bishnoi et al. | |
| 11,750,640 B2 | 9/2023 | Oberg et al. | |
| 11,888,738 B2 | 1/2024 | Chitalia et al. | |
| 11,983,193 B2 | 5/2024 | Xu | |
| 11,989,176 B2 | 5/2024 | Li et al. | |
| 2011/0191361 A1 | 8/2011 | Gupta et al. | |
| 2011/0218978 A1 | 9/2011 | Hong | |
| 2014/0143278 A1 | 5/2014 | Nos et al. | |
| 2022/0121685 A1 | 4/2022 | Zheng et al. | |
| 2025/0148709 A1* | 5/2025 | Villalon | G06T 7/70 |

* cited by examiner

*Primary Examiner* — Ajith Jacob
(74) *Attorney, Agent, or Firm* — Cooper Legal Group, LLC

(57) ABSTRACT

Techniques are provided for performing adaptive sampling for data summarization. An insight service may provide monitoring, troubleshooting, optimization, security, and/or other functionality for a computing environment. The insight service may intake millions to billions of events on a monthly basis from the computing environment, which are stored within a database. The insight service may provide data summarization for the events, which may include access patterns (e.g., file access patterns), anomalies, and ransomware detection. Dynamically querying and generating the data summarization may be impractical due to the sheer amount of events. Accordingly, adaptive sampling is provided for merely sampling certain events based upon various thresholds and criteria being met so that an evaluation output can be dynamically and efficiently generated within an acceptable time as the data summarization.

21 Claims, 13 Drawing Sheets

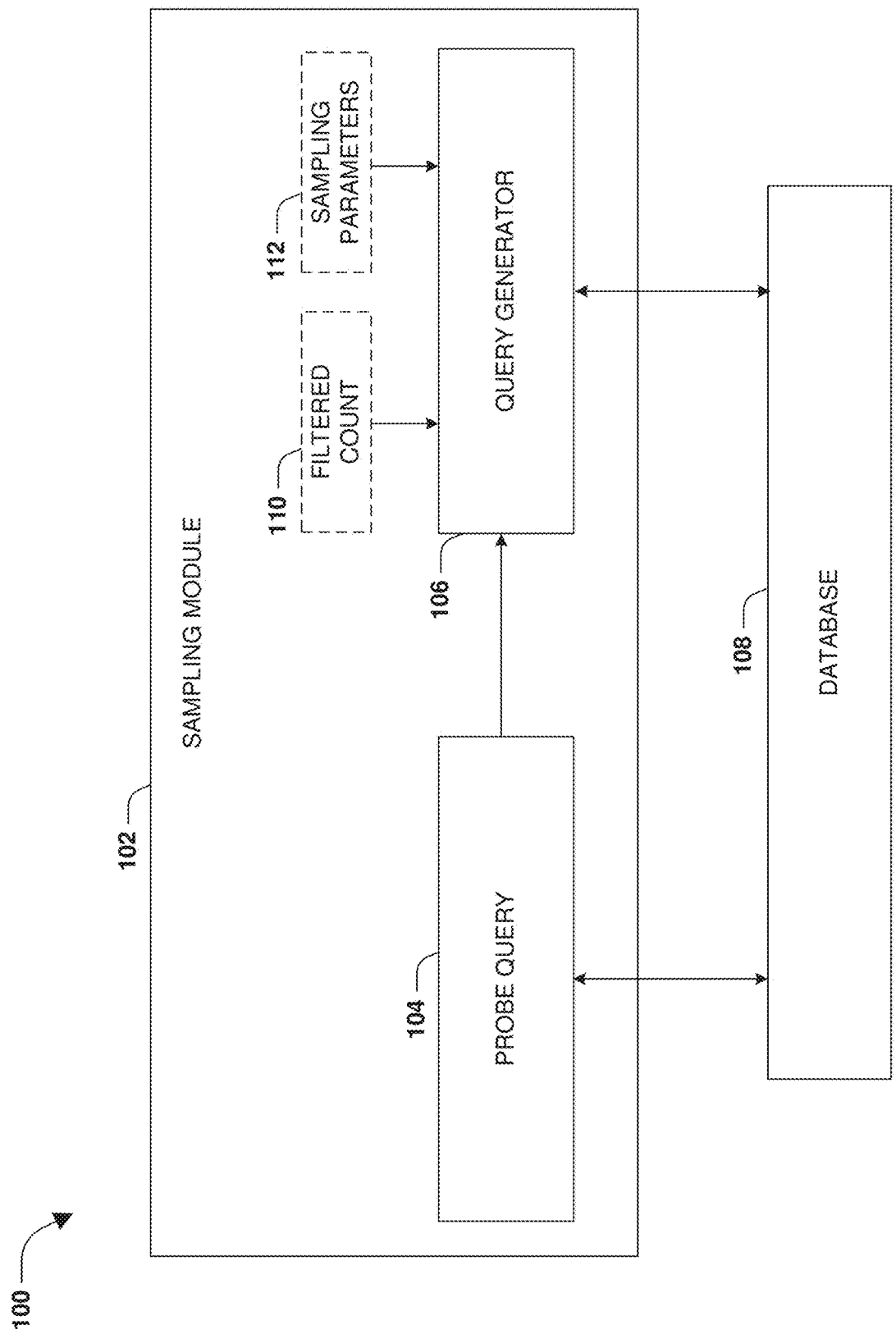

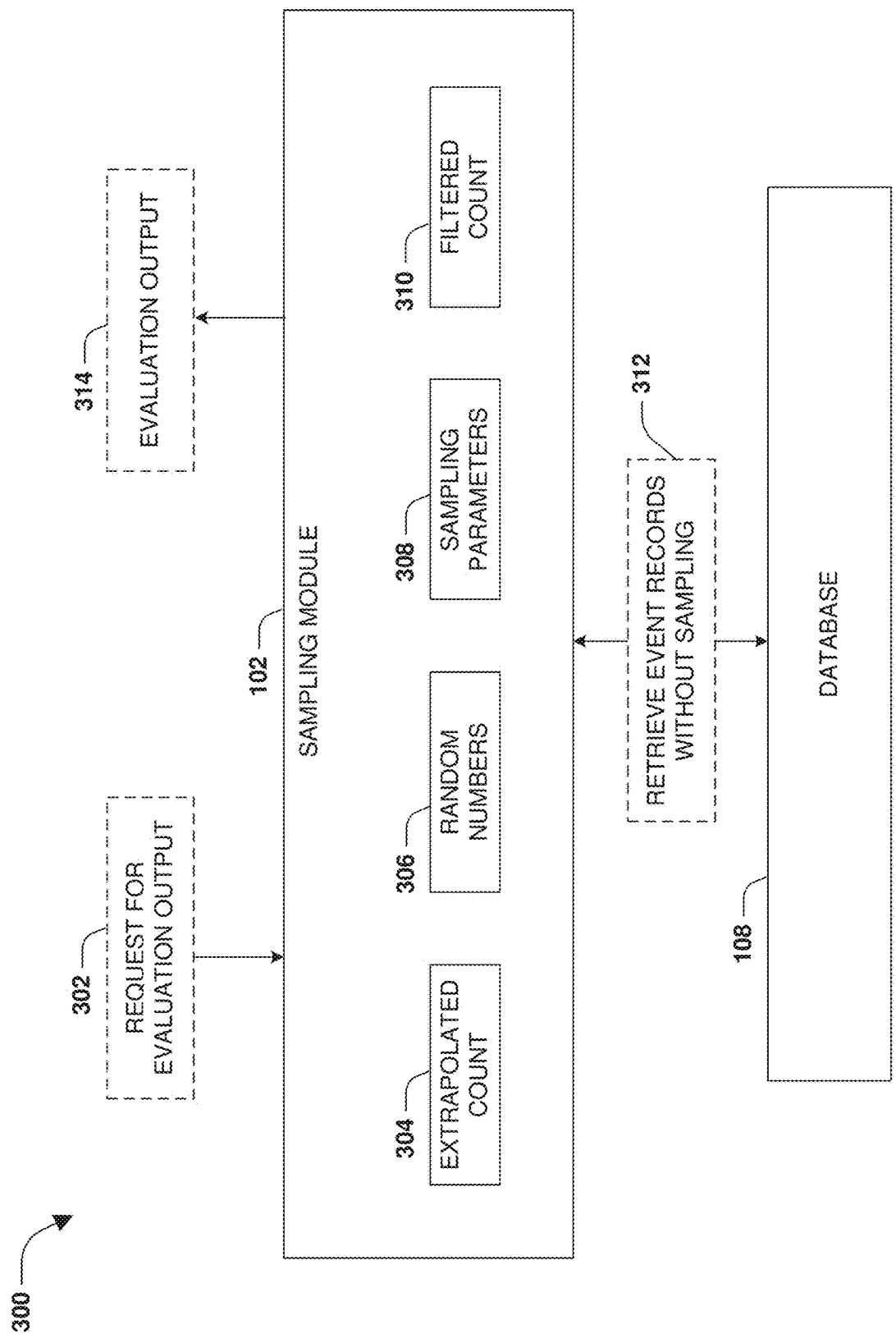

```
SELECT:
    log_event.strAttr12 AS activity,
    COUNT (*) * 16 AS activity_count FROM log_event WHERE (tenantID = '3bb43432-2343-sdf') AND ((time >= 1707392480000) AND (time <= 1708692499000) AND
(log_event.strAttr9 LIKE '%4a%') (rand() % 10000 < (1.0 / 1.4143) * 10000)

GROUP BY activity

ORDER BY activity_count DESC

LIMIT 20

- WRITES: 12243232 ACTIVITY COUNT
- CREATES: 12324111 ACTIVITY COUNT
- RENAMES: 14234234 ACTIVITY COUNT
- DELETES: 12229911 ACTIVITY COUNT
- READS: 12342123 ACTIVITY COUNT

USER INTERFACE

- VIEW GRAPH OF ACTIVITIES OVER TIME
- VIEW ACTIVITY TYPES
- VIEW GRAPH OF TOTAL COUNTS FOR EACH ACTIVITY TYPE
- VIEW GRAPH OF ACTIVITY FOR EACH ENTITY TYPE
- SUBMIT SEARCH
- VIEW LIST OF ACTIVITIES

FIG. 6

… # ADAPTIVE SAMPLING FOR DATA SUMMARIZATION

TECHNICAL FIELD

Various embodiments of the present technology relate to performing adaptive sampling for data summarization.

BACKGROUND

A computing environment, hosting laptops, servers, and/or other computing devices, may leverage an insight service. The insight service may provide monitoring, troubleshooting, optimization, security, and/or other functionality for the computing environment. The insight service may collect billions of events such as file system events from the computing devices within the computing environment (e.g., a file being read, modified, deleted, etc.). The insight service stores these events within a database. The events may be evaluated to generate insight into operation of the computing environment. For example, the insight service may identify access patterns, anomalies, and malicious attacks such as ransomware attacks. The insight service may provide this information through a user interface so that an administrator of the computing environment can address any issues or perform optimizations for the computing environment.

DESCRIPTION OF THE DRAWINGS

Embodiments of the present technology will be described and explained through the use of the accompanying drawings in which:

FIG. 1 is a block diagram illustrating an embodiment of a system for performing adaptive sampling for data summarization, in accordance with an embodiment of the present technology.

FIG. 3A is a block diagram illustrating an embodiment of a system for performing adaptive sampling for data summarization, in accordance with an embodiment of the present technology.

FIG. 5A is a block diagram illustrating an example of a query generated using adaptive sampling, in accordance with various embodiments of the present technology.

FIG. 5B is a block diagram illustrating an example of a query output generated using adaptive sampling, in accordance with various embodiments of the present technology.

FIG. 6 is a block diagram illustrating an example of user interface populated using an evaluation output generated from adaptive sampling, in accordance with various embodiments of the present technology.

Figure 2A:
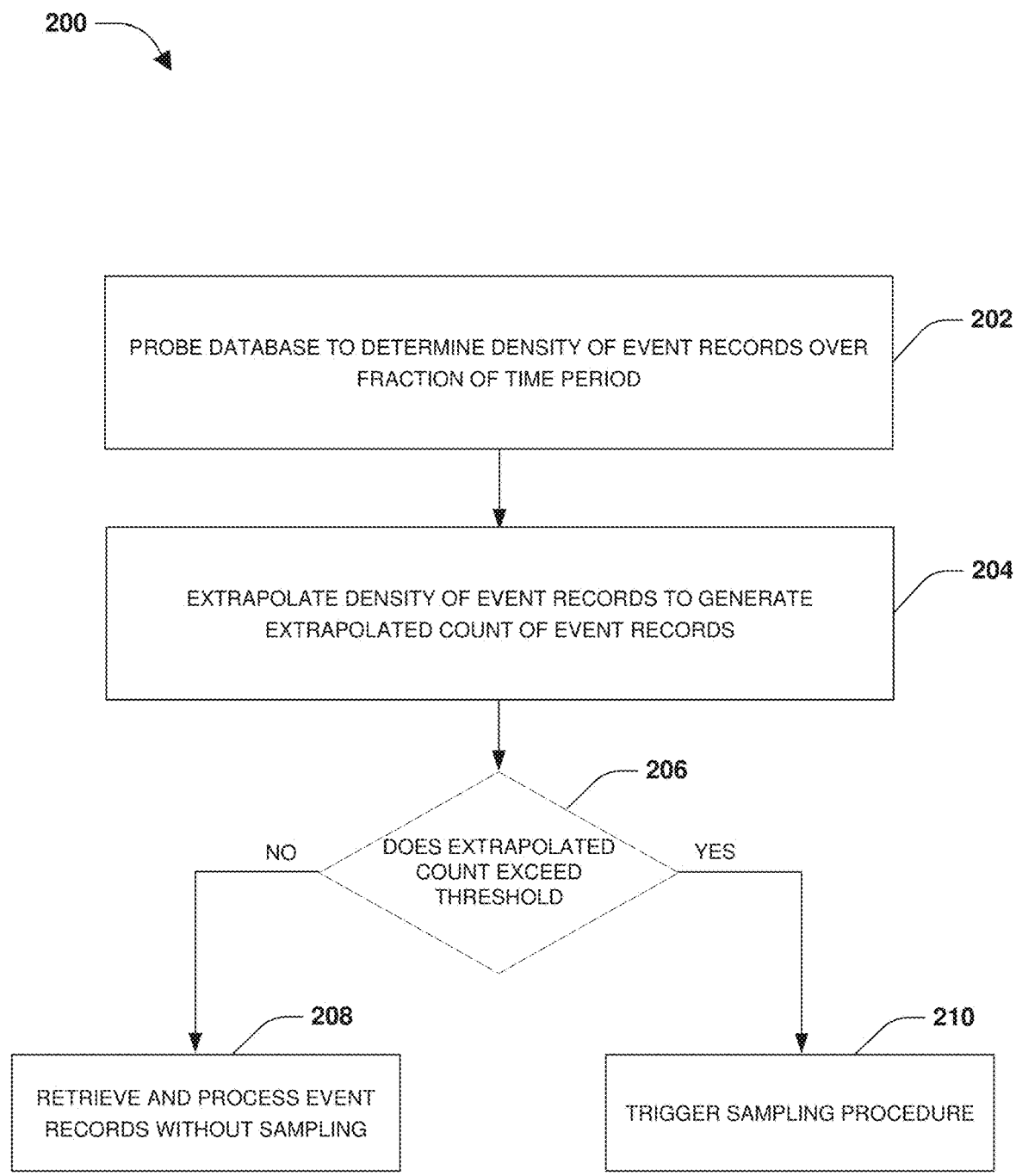
FIG. 2A is a flow chart illustrating an embodiment of a method for performing adaptive sampling for data summarization, in accordance with various embodiments of the present technology.

The drawings have not necessarily been drawn to scale. Similarly, some components and/or operations may be separated into different blocks or combined into a single block for the purposes of discussion of some embodiments of the present technology. Moreover, while the present technology is amenable to various modifications and alternative forms, specific embodiments have been shown by way of example in the drawings and are described in detail below. The intention, however, is not to limit the present technology to the particular embodiments described. On the contrary, the present technology is intended to cover all modifications, equivalents, and alternatives falling within the scope of the present technology as defined by the appended claims.

DETAILED DESCRIPTION

Various embodiments of the present technology relate to performing adaptive sampling for data summarization. An insight service may provide data summarization by collecting file system events from computing devices of a computing environment, evaluating the file system events such as through machine learning, and outputting evaluations that summarize operation of the computing environment. For example, the insight service may identify file access patterns (e.g., users reading, modifying, deleting, and moving files), anomalies (e.g., a user deleting a large number of files), and/or malicious behavior such as ransomware attacks. The insight service may collect and process billions of events that occur over various timespans such a month from various computing devices (e.g., laptops, servers, network equipment, etc.). The events are stored within a database that is queried by the insight service in order to dynamically generate an evaluation output such as data summarization for display through a user interface. The data summarization may be dynamically generated in real-time in response for a user requesting an analysis of file access patterns over the past month, for example. Dynamically querying and generating the data summarization may be impractical due to the sheer amount of events stored within the database. This significantly hinders the ability of the insight service to efficiently generate an evaluation output within a reasonable amount of time. For example, the insight service make take too long to dynamically generate in real-time a chart of file access patterns requested by a user through the user interface because there may be billions of file access events to process.

The disclosed techniques overcome these technical limitations where the insight service is unable to efficiently process a large amount of events in order to dynamically generate data summarization. In particular, adaptive sampling is provided for merely sampling certain events based upon various thresholds and criteria defined by sampling parameters so that an evaluation output can be dynamically generated within an acceptable timeframe. When an evaluation output is to be generated for a time period of event records (e.g., a user has requested charts, analysis, anomaly detection, and access patterns over a 20 day time range), a determination is made as to whether all events over the 20 day time range are to be queried and processed or whether adaptive sampling is to be triggered in order to sample a subset of the events for generating the evaluation output. If the insight service cannot efficiently generate the evaluation output within an acceptable time using all events (e.g., an extrapolated count of all events over the 20 day time range exceeds a threshold such as where more than 200 million events are to be processed), then adaptive sampling is triggered.

Adaptive sampling is performed in an efficient manner by assigning random numbers to blocks of storage that store groups of event records over the 20 day time range in the database. The random numbers are created and assigned in memory to avoid disk access that would otherwise result in unacceptable processing times and an impractical amount of disk accesses. If a random number assigned to a block exceeds a sampling threshold (e.g., if a random number between 1 and 10 is greater than or equal to 6, then the sampling threshold is exceeded; if a random number between 1 and 20 is less than 4, then the sample threshold is exceeded; etc.), then the event records within the block are sampled as sampled event records. Otherwise, the event records within the block are not sampled. In this way, the evaluation output is generated based upon the sampled event records that correspond to a subset of the event records spanning the 20 day time range.

The evaluation output can be dynamically generated within an acceptable timeframe in response to the request from the user, and is generated in a performant manner with reduced computing resource utilization (e.g., less computing resources otherwise consumed in querying all event records spanning the 20 day time range, and less disk accesses due to generating the random numbers in memory). Thus, the insight service can dynamically generate reports, perform actions and/or populate a user interface with information relating to access patterns, anomalies, detected malicious attacks, performance data, identified bottlenecks, identified security risks, troubleshooting actions, etc. The insight service can dynamically perform actions such as a remedial action to troubleshoot a network issue, perform load balancing to address a performance bottleneck, block a computing device, app, or user from network access to stop a ransomware attack, etc.

FIG. 1 is a block diagram illustrating an embodiment of a system 100 for performing adaptive sampling for data summarization. A sampling module 102 may be configured to dynamically perform the adaptive sampling based upon certain criteria being met, which may be defined by various sampling parameters. The sampling module 102 may be hosted by a node such as node 800, a virtual machine, a server, an insight service, or any other software or hardware. A request may be received to generate an evaluation output for a time period, such as an evaluation output related to operation a computing environment over a 24 day time period. In some embodiments, the request may be received through a user interface of the insight service. The request may be for a report regarding access patterns of users accessing files within the computing network over the 24 day time period (e.g., access patterns of employees accessing files on laptops, servers, or other company computing devices). The access patterns may be identified from events such as file system events (e.g., events of users creating files, deleting files, moving files, copying files, modifying files, or any other event/action processed by a file system, operating system, or computing device). The events may be stored as event records within a database 108.

In response to receiving the request, a probe query 104 of the sampling module 102 is invoked to probe the database 108. The probe query 104 probes the database 108 to determine a density of event records over a fraction of the time period of event records to evaluate (e.g., 3 hours, 2 days, or some other fraction of the 24 day time period). The probe query 104 extrapolates the density of event records (e.g., 1.2 million event records over 2 days) to generate an extrapolated count of event records over the time period (14.4 million event records for the 24 day time period). The probing and extrapolating by the probe query 104 results is a significantly smaller number of reads from the database 108 compared to a full query to read all event records over the 24 day time period such as where merely event records over the 2 days are probed. In some embodiments, the probe query selects certain days that may be representative of the overall dataset of event records, such as workdays instead of non-workdays (weekends).

The sampling module 102 compares the extrapolated count of event records with a threshold (e.g., a 6 million event record threshold). If the extrapolated count does not exceed the threshold, then a full query of the database 108 for event records spanning the 24 day time period is performed. If the extrapolated count exceeds the threshold, then a sampling procedure is triggered. The threshold is defined to have a value such that the improved efficiency and reduced time of obtaining and processing a subset of the event records (improved performance) outweighs the loss of accuracy from not processing all event records.

In response to triggering the sampling procedure, a query generator 106 is invoked to execute the sampling procedure. The query generator 106 may utilized a filtered count to determine whether to proceed with executing the sampling procedure, to disable the sampling procedure, or to adjust a sampling count or threshold. The filtered count 110 may be tracked from prior execution of the sampling procedure. The filtered count 110 may relate to a number of sampled event records that were sampled by the prior execution of the sampling procedure. If the number of sampled event records is below a disable sampling threshold (e.g., not enough event records were sampled to achieve a desired accuracy of the evaluation output such as where a ransomware attack would not be identified), then the sampling procedure may be disable or the sampling threshold may be adjusted. The sampling threshold may be adjusted so that more event record will be sampled (e.g., the sampling threshold may be changed from 5 to 3 on a scale of 1 to 10 so that any block assigning a random number of 3 or above will now be sampled instead of 5 or above). If the number of sampled event records that were sampled by the prior execution of the sampling procedure is too low, then the requested evaluation output may be inaccurate because not enough event records would be sampled to generate the evaluation output.

If the query generator 106 is to execute the sampling procedure, then the query generator 106 utilizes sampling parameters 112 and/or filters (e.g., a filter used to select only event records pertaining to read operations, a filter used to select only event records pertaining to operations directed to a particular file or set of files, etc.). Various sampling parameters 112 may be used, which will be described in further detail in relation to FIG. 4. The sampling parameters 112 are used to determine when to enable or disable the sampling procedure, how many event records to sample, and limits to the number of event records sampled. In this way, the query generator 106 will determine whether and how to execute the sampling procedure based upon the filtered count, the sampling parameters, and/or the filters.

As part of executing the sampling procedure, the query generator 106 assigns random numbers for blocks storing groups of event records over the time period. That is, the event records within the database 108 are stored in blocks of physical storage, and thus certain blocks may store the event records of events that occurred during the 24 day time period. The random numbers may be generated within memory without accessing disk storage so that the random numbers are generated in a resource efficient manner. In some embodiments, each block is assigned a random number from 1 to 10 (or any other range of numbers). If a random number for a block exceeds a sampling threshold (e.g., if a random number is greater than or equal to 7, then the sampling threshold is exceeded; if a random number is less than 4, then the sample threshold is exceeded; etc.), then event records within the block are sampled. If the random number for the block does not exceed the sampling threshold, then the event records within the block are not sampled. In this way, certain event records are sampled as sampled event records, while other event records are not sampled.

An evaluation output is generated using the sampled event records. In some embodiments, the evaluation output corresponds to access patterns, a searchable list of event records, charts or graphs, and/or other information and statistics derived from the sampled event records. The evaluation output may be populated within a user interface for access by a user such as an administrator of the computing environment. It may be appreciate that the evaluation output may be populated with a variety of information and/or may relate to computer implemented actions performed based upon the sampled event records. For example, machine learning functionality may be invoked to evaluate the sampled event records to identify an anomaly corresponding to malicious activity within the computing environment, and thus a computer implemented action is performed to block/stop the malicious activity (e.g., blocking a user, application, or computing device from accessing services and storage resources within the computing environment).

Figure 2B:
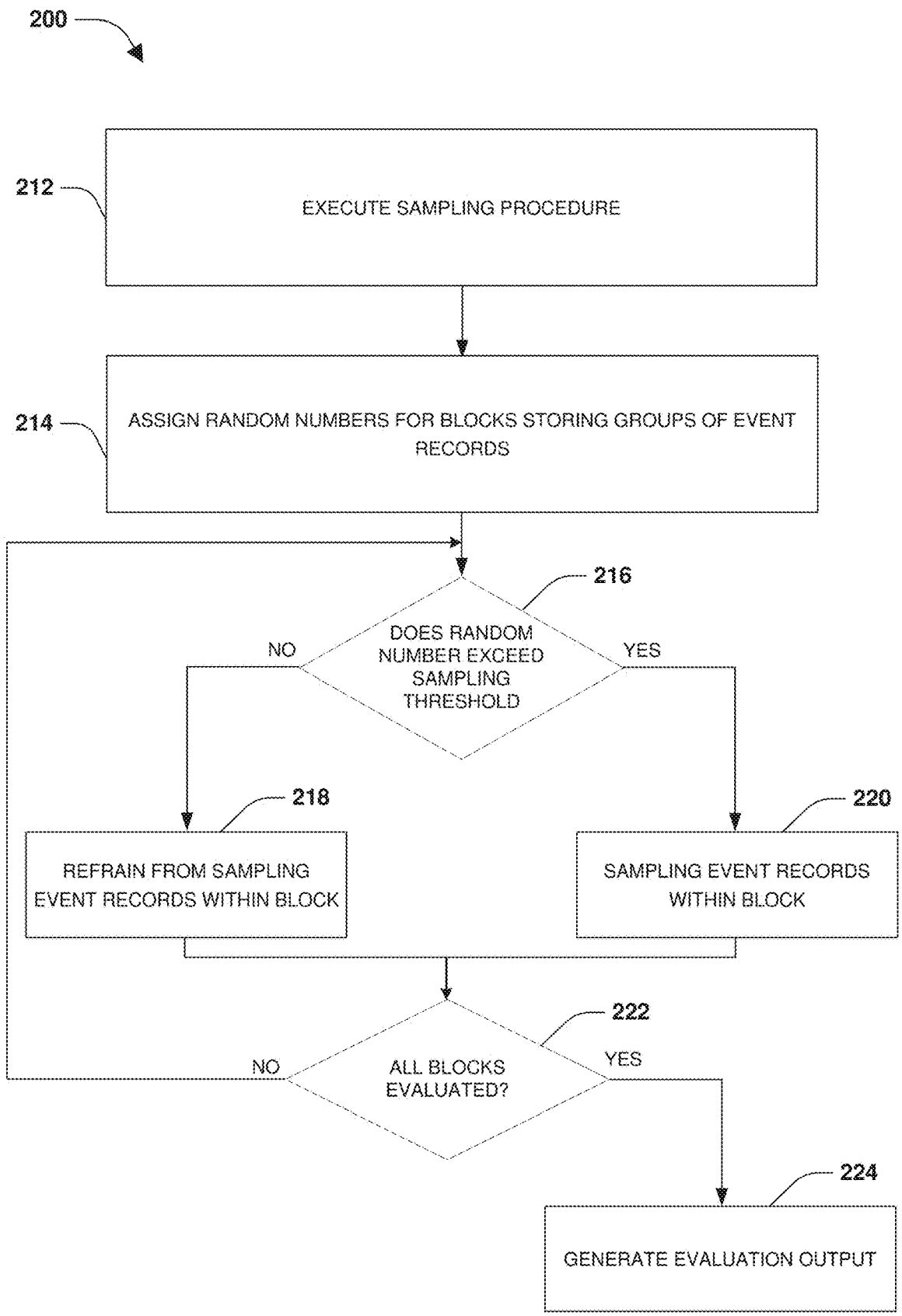
FIG. 2B is a flow chart illustrating an embodiment of a method for performing adaptive sampling for data summarization, in accordance with various embodiments of the present technology.
Figure 3B:
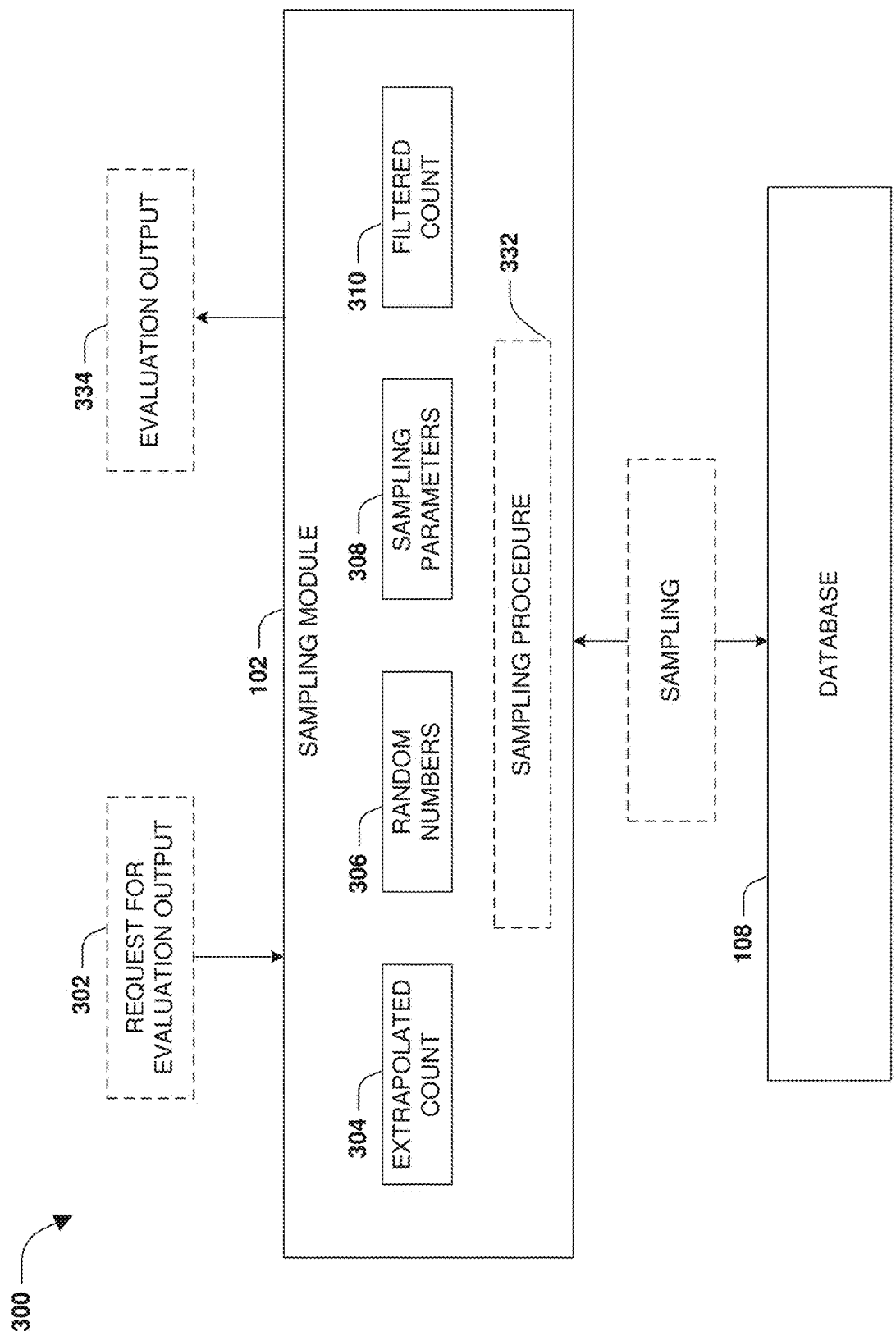
FIG. 3B is a block diagram illustrating an embodiment of a system for performing adaptive sampling for data summarization, in accordance with an embodiment of the present technology.
Figure 3C:
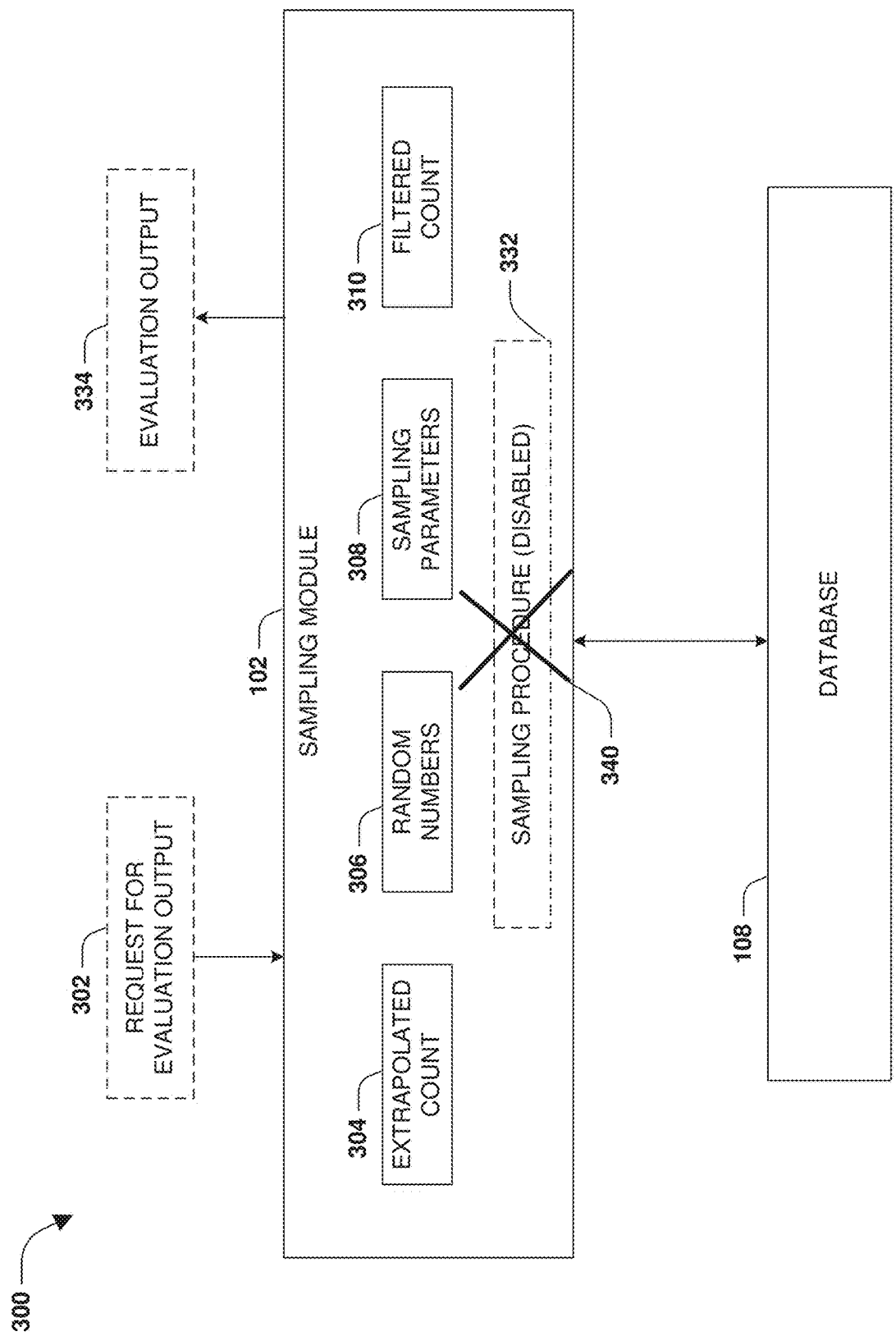
FIG. 3C is a block diagram illustrating an embodiment of a system for performing adaptive sampling for data summarization, in accordance with an embodiment of the present technology.

FIGS. 2A-2B are flow charts illustrating an embodiment of a method 200 for performing adaptive sampling for data summarization, which is described in conjunction with system 300 of FIGS. 3A-3C. A sampling module 102 may receive a request 302 for an evaluation output, as illustrated by FIG. 3A. The request 302 may be for access patterns of write operations by certain users to files within a computing environment over a 44 day time period. The request 302 may specify the 44 day time period, the write operations, and the certain users as filters to apply to event records of events (e.g., file system events) tracked within a database 108.

In response to receiving the request 302, the sampling module 102 probes the database 108 to determine a density of event records occurring over a fraction of the time period of event records to evaluate (e.g., a density of event records over 4 days of the 44 day time period, which may be identified as 2 million event records), during operation 202 of method 200. During operation 204 of method 200, the sample module 102 extrapolates the density of event records to generate an extrapolated count 304 of event records over the time period (e.g., the 2 million event records of the 4 days may be extrapolated to 22 million event records over the 44 day time period).

During operation 206 of method 200, the sampling module 102 may compare the extrapolated count with a threshold to determine whether to retrieve all event records over the 44 day time period or to sample a subset of the event records over the 44 day time period. The threshold may be defined with a value such that the improved performance and reduced time of obtaining and processing the subset of the event records outweighs the loss of accuracy from not processing all event records over the 44 day time period. In some embodiments, the threshold is set based upon an optimum dataset size sampling parameter for determining an amount of sampling to perform (a sampling size). The amount of sampling (sampling size) to perform may be determined based upon a percentage of the event records to sample. The percentage of the event records to sample may be based upon the extrapolated count 304.

In some embodiments, the sampling module 102 may determine that the extrapolated count does not exceed the threshold, as illustrated by FIG. 3A. Accordingly, a sampling procedure is not triggered and the database 108 is queried for all event records spanning the 44 day time period using the filter(s) specified by the request 302, during operation 208 of method 200. In this way, the event records are retrieved 312 without sampling, and an evaluation output 314 is generated.

Figure 4:
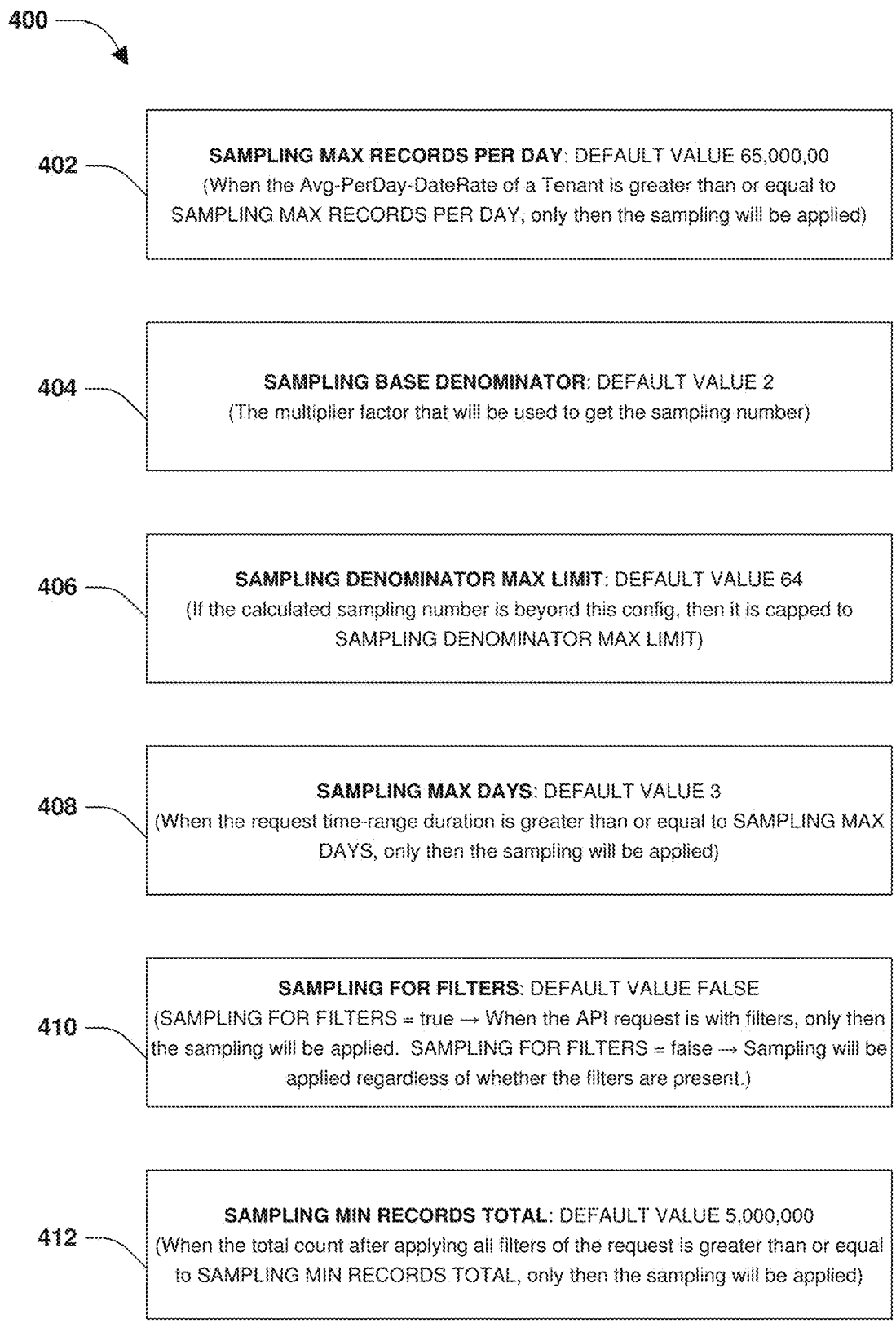
FIG. 4 is a block diagram illustrating an example of sampling parameters, in accordance with various embodiments of the present technology.

In some embodiments, the sampling module 102 may determine that the extrapolated count exceeds the threshold, as illustrated by FIG. 3B. Accordingly, the sampling module 102 triggers a sampling procedure 332, during operation 210 of method 200. The sampling module 102 executes the sampling procedure, during operation 212 of method 200, utilizing sampling parameters 308. FIG. 4 illustrates an example 400 of the sampling parameters 308. In some embodiments, the sampling parameters 308 include a sampling max records per day sampling parameter 402 used to determine when to enable the sampling procedure 332. The sampling max records per day sampling parameter 402 may be set to a default value that can be overridden (e.g., 65 million or any other value). If an average per day data rate of a tenant (e.g., a rate of event records being generated by a tenant of the computing environment for storage within the database 108) is greater than or equal to the sampling max records per day sampling parameter 402, only then is the sampling procedure 332 enabled.

In some embodiments, the sampling parameters 308 include a sampling base denominator sampling parameter 404. The sampling base denominator sampling parameter 404 is used as a multiplier factor to determine a sampling number of event records to sample by the sampling procedure 332. The sampling base denominator sampling parameter 404 may be set to a default value that can be overridden (e.g., 2 or any other value).

In some embodiments, the sampling parameters 308 include a sampling denominator maximum limit sampling parameter 406 used to limit the sampling number of event records to sample by the sampling procedure 332. The sampling denominator maximum limit sampling parameter 406 may be set to a default value that can be overridden (e.g., 64 or any other value). If a calculated sampling value (e.g., a value related to a count of event records to sample) is beyond a value of the sampling denominator maximum limit sampling parameter 406, then the sampling denominator maximum limit sampling parameter 406 is used to limit/cap the sampling value.

In some embodiments, the sampling parameters 308 include a sampling maximum days sampling parameter 408 used to determine whether to enable or disable the sampling procedure 332. The sampling maximum days sampling parameter 408 may be set to a default value that can be overridden (e.g., 3 days or any other value). If the request time-range duration specifying the time period (e.g., 44 days) is greater than or equal to the sampling maximum days sampling parameter 408, then the sampling procedure 332 is enabled, otherwise, the sampling procedure 332 is disabled.

In some embodiments, the sampling parameters 308 include a sampling for filters sampling parameter 410 used to determine whether to enable or disable the sampling procedure 332 based upon whether the request 302 has filters for querying/processing the event records (e.g., filter event records to a specific user, a specific type of operation such as read or write, etc.). The sampling for filters sampling parameter 410 may be set of a default value that can be overridden (e.g., false). If the sampling for filters sampling parameter 410 is set to true and the request 302 includes a filter, then the sampling procedure 332 is enabled, otherwise the sampling procedure 332 is disabled. If the sampling for filters sampling parameter 410 is set to false and the request 302 includes a filter, then the sampling procedure 332 is enabled. If the sampling for filters sampling parameter 410 is set to false and the request 302 does not include any filters, then the sampling procedure 332 is enabled.

In some embodiments, the sampling parameters 308 include a sampling minimum records total sampling parameter 412 used to determine whether to enable or disable the sampling procedure 332. The sampling minimum records total sampling parameter 412 may be set to a default value that can be overridden (e.g., 5 million or any other value). In particular, a total count of event records after applying any filters specified by the request 302 for the event records to process is determined. If the total count of event records is greater than or equal to the sampling minimum records total sampling parameter 412, then the sampling procedure 332 is enabled, otherwise the sampling procedure 332 is disabled.

In some embodiments, if any filters were specified for the event records to process, then the filters are applied as part of executing the sampling procedure 332. In some embodiments, the filters are applied before the sampling parameters 308 are considered for controlling the sampling procedure 332.

During operation 214 of method 200, the sampling module 102 assigns random numbers 306 to blocks of storage that store groups of event records over the time period within the database 108 (e.g., records within the database 108 storing file system events that occurred over the 44 day time period). The random numbers 306 may be generated within memory without accessing disk storage, thus making the sampling procedure 332 efficient because a significant/impractical number of disk accesses do not need to be performed.

For each block assigned a random number, the sampling module 102 determines whether a random number of a block exceeds a sampling threshold, during operation 216 of method 200. In some embodiments, the random number is checked to see if the random number is divisible by a number (e.g., are random numbers divisible by 4, and thus about 25% of event records will be sampled). If the random number does not exceed the sampling threshold (or is not divisible by the number), then the block is not sampled, during operation 218 of method 200. If the random number exceeds the sampling threshold, then the block is sampled, during operation 220 of method 200. In some embodiments, a query is generated for selecting columns within the database 108 (e.g., a ClickHouse database) that stores the event records. The query is generated with record selection filters (e.g., the filters specified by the request 302) and/or a random number generation function for sampling the event records. In this way, the query is executed against the database 108 to retrieve the sampled event records.

During operation 222 of method 200, a determination is made as to whether there are any blocks left to evaluate. If there are additional blocks to evaluate, then the method 200 returns to operation 216. If there are no additional blocks to evaluate, then an evaluation output 334 is generated based upon the sampled event records that were sampled by the sampling procedure 332, during operation 224 of method 200. In some embodiments, the evaluation output 334 is populated with information, charts, graphs, and/or other visual data that is displayed through a user interface (e.g., a graph of file system events occurring over the time period; a list of file system events to view; etc.). In some embodiments, the evaluation output 334 includes access patterns identified from file system events described by the sampled event records (e.g., read access patterns by user(s) to file(s) over time, write access patterns by user(s) to the file(s) over time, etc.). In some embodiments, machine learning functionality is executed upon the access patterns using a model to identify an anomaly corresponding to a malicious activity within the computing environment (e.g., a user or application deleting or attempting to access sensitive files). The evaluation output 334 may relate to the sampling module 102 performing a remedial action to stop the malicious activity (e.g., a command may be sent to a computing device within the computing environment to block the user or application from further accessing files within the computing environment). A notification of the malicious activity and/or the remedial action may be displayed through the user interface.

In some embodiments, a filtered count 310 is determined. The filtered count 310 may correspond to a number/count of the sampled event records. If the filtered count 310 falls below a disabled sampling threshold, then the sampling procedure is disabled 340, as illustrated by FIG. 3C. The disabled sampling threshold may be set based upon an accuracy metric for the evaluation output 334 (e.g., if too few event records are being sampled, then an accuracy of the evaluation output 334 may fall below an acceptable accuracy).

FIG. 5A is a block diagram illustrating an example of a query 500 generated using adaptive sampling. The query 500 may comprise a select clause to select log events as an activity. The query 500 may comprise a from clause specifying that the query is to access event records from a log event data source. The query may comprise a where clause that includes filters (e.g., tenantID and a time period). The query may comprise other clauses such as a group by clause, an order by clause, a limit clause, etc. In some embodiments, the query 500 may include a sampling expression, such as (rand ( ) % 10000< (1.0/1.4143)*10000) for sampling 50% of event records.

FIG. 5B is a block diagram illustrating an example of a query output 550 generated using adaptive sampling. In some embodiments, the query output 550 relates to an evaluation output generated using sampled events. The query output 550 may specify activity counts for different types of access operations, such as write operations, create operations, rename operations, delete operations, read operations, etc.

FIG. 6 is a block diagram illustrating an example of user interface 600 populated using an evaluation output generated from adaptive sampling. The user interface 600 may be populated with interface elements for viewing graphs of activities over time, activity types, graphs of total counts for each activity type, graphs of activities for each entity type, the ability to search for event records, a list of activities, etc.

Figure 7:
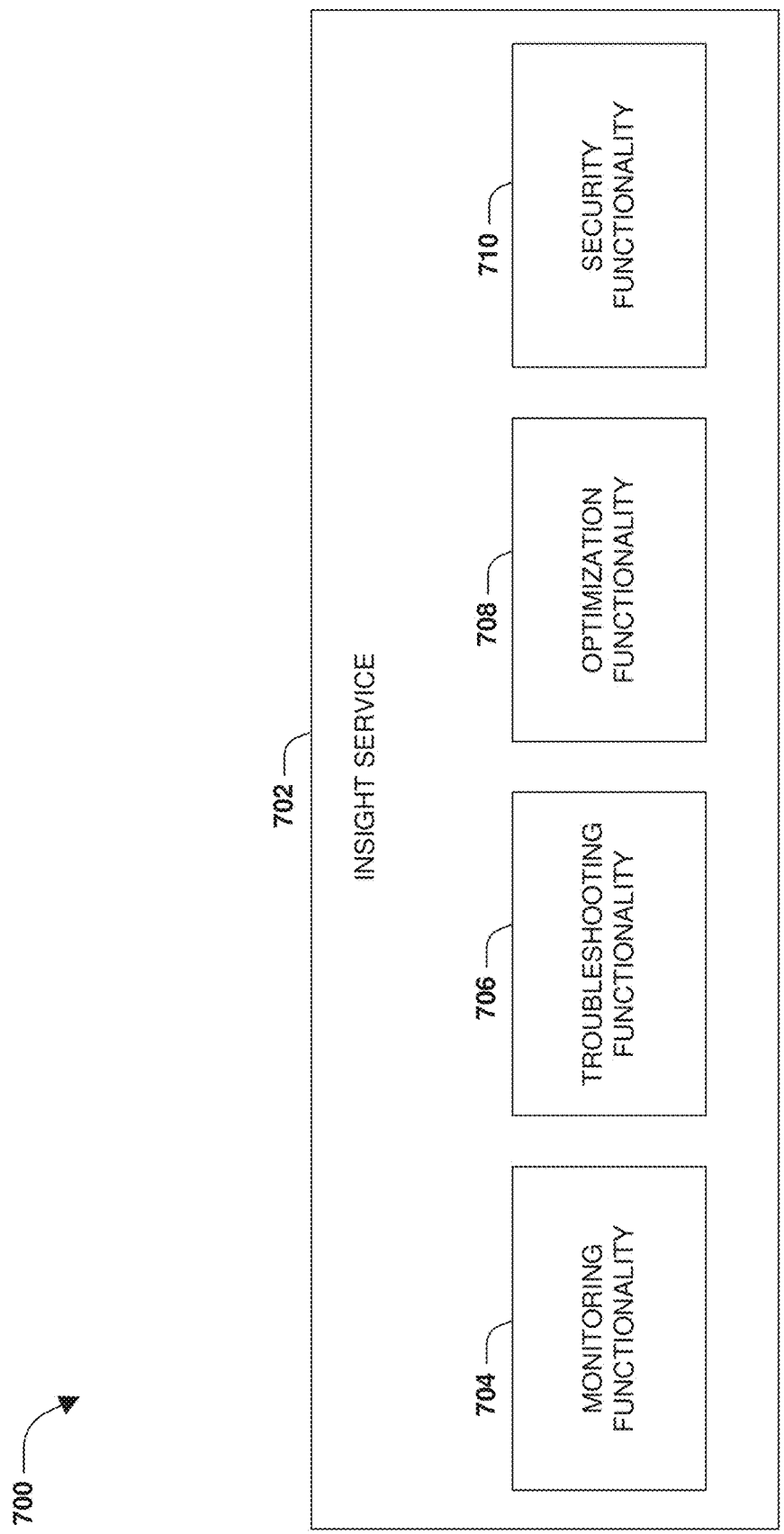
FIG. 7 is a block diagram illustrating an embodiment of a system for performing adaptive sampling for data summarization, in accordance with an embodiment of the present technology.

FIG. 7 is a block diagram illustrating an embodiment of a system 700 for performing adaptive sampling for data summarization. The system 700 may include an insight service 702 that may be hosted by one or more servers. The insight service 702 may provide monitoring functionality 704 for monitoring events within a computing environment. The insight service 702 may provide troubleshooting functionality 706 for troubleshooting hardware, software, applications, network connectivity, and/or other issues within the computing environment. The insight service 702 may provide optimization functionality 708 that modifies software and/or device configurations within the computing environment for improving performance and operation of devices. The insight service 702 may provide security functionality 710 for detecting anomalies, ransomware attacks, and/or other malicious activities. The security functionality 710 may provide notifications and/or perform remedial actions for detected security issues or attacks. The insight service 702 may utilize the sampling module 102 to perform adaptive sampling to obtain records event from a database. The record events are used by the insight service 702 so that the functionality can be provided dynamically and/or on-demand in a performant manner.

The disclosed techniques provide the ability to efficiently process vast datasets in order to enhance summarization of data. A probe query assess data density within a database within short intervals, which is used to determine an optimal downsampling factor for raw data (event records stored within blocks of storage). The optimal downsampling factor is applied to generate queries to selectively downsample the raw data. Summarization of the downsampled data is executed within a reasonable timeframe, while maintaining a balance between speed of generating the summarization and accuracy of the summarization. The summarized data is extrapolated to produce a final evaluation output.

Sampling (probing) based upon probability is performed by having the database generate a random number for every row. The generated number is checked for divisibility by a sampling factor N. This provides the advantage where the database does not have to read another column from disk merely to perform the sampling (probing). Additionally, since the random number is generated by the database is per block so that the database can skip blocks to read.

In some embodiments, a method is provided. The method includes probing a database to determine a density of event records occurring over a fraction of a time period of event records to evaluate; extrapolating the density of event records to generate an extrapolated count of event records over the time period; in response to the extrapolated count exceeding a threshold, triggering a sampling procedure comprising: assigning random numbers for blocks storing groups of event records over the time period; and for each block assigned a random number: in response to the random number assigned to a block exceeding a sampling threshold, sampling event records within the block as sampled event records, otherwise, refraining from sampling the event records; and generating an evaluation output based upon the sampled event records sampled by the sampling procedure.

In some embodiments, the method comprises evaluating file system events described by the sampled event records to identify access patterns of users accessing data of a computing system; and providing the access patterns as the evaluation output through a user interface.

In some embodiments, the method comprises executing machine learning functionality upon the access patterns to identify an anomaly corresponding to a malicious action within the computing system; and generating the evaluation output to include a notification of the malicious action.

In some embodiments, the method comprises generating the random numbers within memory without accessing disk storage.

In some embodiments, the method comprises determining a filtered count associated with a number of sampled event records; and in response to the filtered count falling below a disable sampling threshold, disabling the sampling procedure, wherein the disable sampling threshold is set based upon an accuracy metric for the evaluation output.

In some embodiments, the method comprises generating a query for selecting columns within a database storing the event records, wherein the query is generated with record selection filters and a random number generation function for sampling the event records; and executing the query against the database to retrieve the sampled event records.

In some embodiments, the method comprises determining a percentage of the event records to sample based upon the extrapolated count; and setting an optimum dataset size sampling parameter as the threshold for determining an amount of sampling to perform based upon the percentage.

In some embodiments, the method comprises receiving a filter to apply for the event records; and applying the filter before applying sampling parameters used to control the sampling procedure.

In some embodiments, the method comprises dynamically applying filters for the event records as part of executing the sampling procedure.

In some embodiments, a computing device is provided. The computing device comprises a memory comprising machine executable code; and a processor coupled to the memory, the processor configured to execute the machine executable code to cause the machine to perform operations comprising: probing a database to determine a density of event records occurring over a fraction of a time period of event records to evaluate; extrapolating the density of event records to generate an extrapolated count of event records over the time period; in response to the extrapolated count exceeding a threshold, triggering a sampling procedure comprising: assigning random numbers for blocks storing groups of event records over the time period; and for each block assigned a random number: in response to the random number assigned to a block exceeding a sampling threshold, sampling event records within the block as sampled event records, otherwise, refraining from sampling the event records; and generating an evaluation output based upon the sampled event records sampled by the sampling procedure.

In some embodiments, the operations comprise defining a sampling max records per day sampling parameter; and utilizing the sampling max records per day sampling parameter to determine when to enable the sampling procedure.

In some embodiments, the operations comprise defining a sampling base denominator sampling parameter; and utilizing the sampling base denominator sampling parameter as a multiplier factor to determine a sampling number of event records to sample by the sampling procedure.

In some embodiments, the operations comprise defining a sampling denominator maximum limit sampling parameter; and utilizing the sampling denominator maximum limit sampling parameter to limit a sampling number of event records to sample by the sampling procedure.

In some embodiments, the operations comprise defining a sampling maximum days sampling parameter; and in response to a request time-range duration specifying the time period being greater than or equal to the sampling maximum days sampling parameter, enabling the sampling procedure, otherwise, disabling the sampling procedure.

In some embodiments, the operations comprise defining a sampling for filters sampling parameter; and in response to the sampling for filters sampling parameter being set to true and receiving a request with a filter for processing the event records, enabling the sampling procedure, otherwise, disabling the sampling procedure.

In some embodiments, the operations comprise defining a sampling for filters sampling parameter; and in response to the sampling for filters sampling parameter being set to false and receiving a request with a filter for processing the event records, enabling the sampling procedure.

In some embodiments, the operations comprise defining a sampling for filters sampling parameter; and in response to the sampling for filters sampling parameter being set to false and receiving a request without any filters for processing the event records, enabling the sampling procedure.

In some embodiments, the operations comprise defining a sampling minimum records total sampling parameter; determining a count of event records after applying any filters specified for the event records to process; and in response to the count of event records being greater than or equal to the sampling minimum records total sampling parameter, enabling the sampling procedure, otherwise, disabling the sampling procedure.

In some embodiments, a non-transitory machine readable medium is provided. The non-transitory machine readable medium comprises instructions for performing a method, which when executed by a machine, causes the machine to perform operations comprising: probing a database to determine a density of event records occurring over a fraction of a time period of event records to evaluate; extrapolating the density of event records to generate an extrapolated count of event records over the time period; in response to the extrapolated count exceeding a threshold, triggering a sampling procedure comprising: assigning random numbers for blocks storing groups of event records over the time period; and for each block assigned a random number: in response to the random number assigned to a block exceeding a sampling threshold, sampling event records within the block as sampled event records, otherwise, refraining from sampling the event records; and generating an evaluation output based upon the sampled event records sampled by the sampling procedure.

In some embodiments, the instructions cause the machine to populate a user interface with the evaluation output.

In some embodiments, a system is provided. The system comprises a means for probing a database to determine a density of event records occurring over a fraction of a time period of event records to evaluate. In some embodiments, a probe query 104, hosted by a sampling module 102 (e.g., instructions stored within memory 802 and executed by a processor 801 of node 800), performs the probing by submitting queries to a database. The system comprises a means for extrapolating the density of event records to generate an extrapolated count of event records over the time period. In some embodiments, the probe query 104, hosted by the sampling module 102 (e.g., instructions stored within memory 802 and executed by the processor 801 of the node 800), performs the extrapolating. The system comprises a means for triggering a sampling procedure based upon the extrapolated count exceeding a threshold. In some embodiments, the sampling module 102 (e.g., instructions stored within memory 802 and executed by the processor 801 of the node 800) triggers and executes the sampling procedure by comparing the extrapolated count generated by the probe query 104 with the threshold. The sampling procedure comprises assigning random numbers for blocks storing groups of event records over the time period; and for each block assigned a random number: in response to the random number assigned to a block exceeding a sampling threshold, sampling event records within the block as sampled event records, otherwise, refraining from sampling the event records. The system comprises a means for generating an evaluation output based upon the sampled event records sampled by the sampling procedure. In some embodiments, the sampling module 102 (e.g., instructions stored within memory 802 and executed by the processor 801 of the node 800) evaluates the sampled event records to identify patterns, trends, and anomalies (outlier data points) to generate the evaluation output by executing machine learning functionality such as a model trained to identify patterns, trends, and anomalies based upon file system events.

Figure 8:
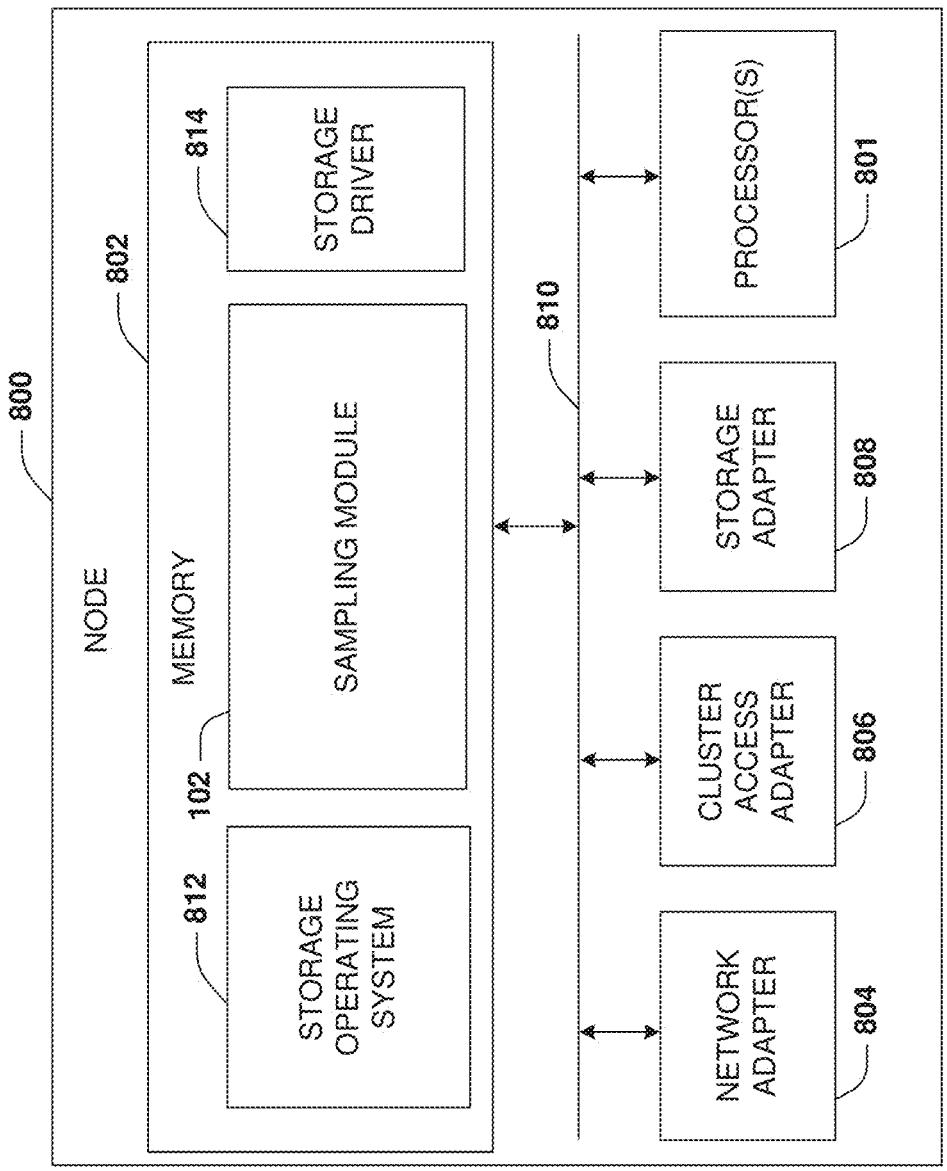
FIG. 8 is a block diagram illustrating an example of a node in accordance with various embodiments of the present technology.

Referring to FIG. 8, a node 800 (also referred to as a storage node) in this particular example includes processor(s) 801, a memory 802, a network adapter 804, a cluster access adapter 806, and a storage adapter 808 interconnected by a system bus 810. In other examples, the node 800 comprises a virtual machine, such as a virtual storage machine.

The node 800 also includes a storage operating system 812 installed in the memory 802 that can, for example, implement a RAID data loss protection and recovery scheme to optimize reconstruction of data of a failed disk or drive in an array, along with other functionality such as deduplication, snapshot creation, data mirroring, synchronous replication, asynchronous replication, encryption, etc.

The network adapter 804 in this example includes the mechanical, electrical and signaling circuitry needed to connect the node 800 to one or more of the client devices over network connections, which may comprise, among other things, a point-to-point connection or a shared medium, such as a local area network. In some examples, the network adapter 804 further communicates (e.g., using Transmission Control Protocol/Internet Protocol (TCP/IP)) via a cluster fabric and/or another network (e.g., a WAN (Wide Area Network)) (not shown) with storage devices of a distributed storage system to process storage operations associated with data stored thereon.

The storage adapter 808 cooperates with the storage operating system 812 executing on the node 800 to access information requested by one of the client devices (e.g., to access data on a data storage device managed by a network storage controller). The information may be stored on any type of attached array of writeable media such as magnetic disk drives, flash memory, and/or any other similar media adapted to store information.

In exemplary data storage devices, information can be stored in data blocks on disks. The storage adapter 808 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 808 and, if necessary, processed by the processor(s) 801 (or the storage adapter 808 itself) prior to being forwarded over the system bus 810 to the network adapter 804 (and/or the cluster access adapter 806 if sending to another node computing device in the cluster) where the information is formatted into a data packet and returned to a requesting one of the client devices and/or sent to another node computing device attached via a cluster fabric. In some examples, a storage driver 814 in the memory 802 interfaces with the storage adapter to facilitate interactions with the data storage devices.

The storage operating system 812 can also manage communications for the node 800 among other devices that may be in a clustered network, such as attached to the cluster fabric. Thus, the node 800 can respond to client device requests to manage data on one of the data storage devices or storage devices of the distributed storage system in accordance with the client device requests.

A file system module of the storage operating system 812 can establish and manage one or more file systems including software code and data structures that implement a persistent hierarchical namespace of files and directories, for example. As an example, when a new data storage device (not shown) is added to a clustered network system, the file system module is informed where, in an existing directory tree, new files associated with the new data storage device are to be stored. This is often referred to as "mounting" a file system.

In the example node 800, memory 802 can include storage locations that are addressable by the processor(s) 801 and adapters 804, 806, and 808 for storing related software application code and data structures. The processor(s) 801 and adapters 804, 806, and 808 may, for example, include processing elements and/or logic circuitry configured to execute the software code and manipulate the data structures.

The storage operating system 812, portions of which are typically resident in the memory 802 and executed by the processor(s) 801, invokes storage operations in support of a file service implemented by the node 800. Other processing and memory mechanisms, including various computer readable media, may be used for storing and/or executing application instructions pertaining to the techniques described and illustrated herein.

In some embodiments, the sampling module 102 is implemented by the node 800 in order to perform adaptive sampling using the disclosed techniques described in relation to FIGS. 1-7.

The examples of the technology described and illustrated herein may be embodied as one or more non-transitory computer or machine readable media, such as the memory 802, having machine or processor-executable instructions stored thereon for one or more aspects of the present technology, which when executed by processor(s), such as processor(s) 801, cause the processor(s) to carry out the steps necessary to implement the methods of this technology, as described and illustrated with the examples herein. In some examples, the executable instructions are configured to perform one or more steps of a method described and illustrated later.

Figure 9:
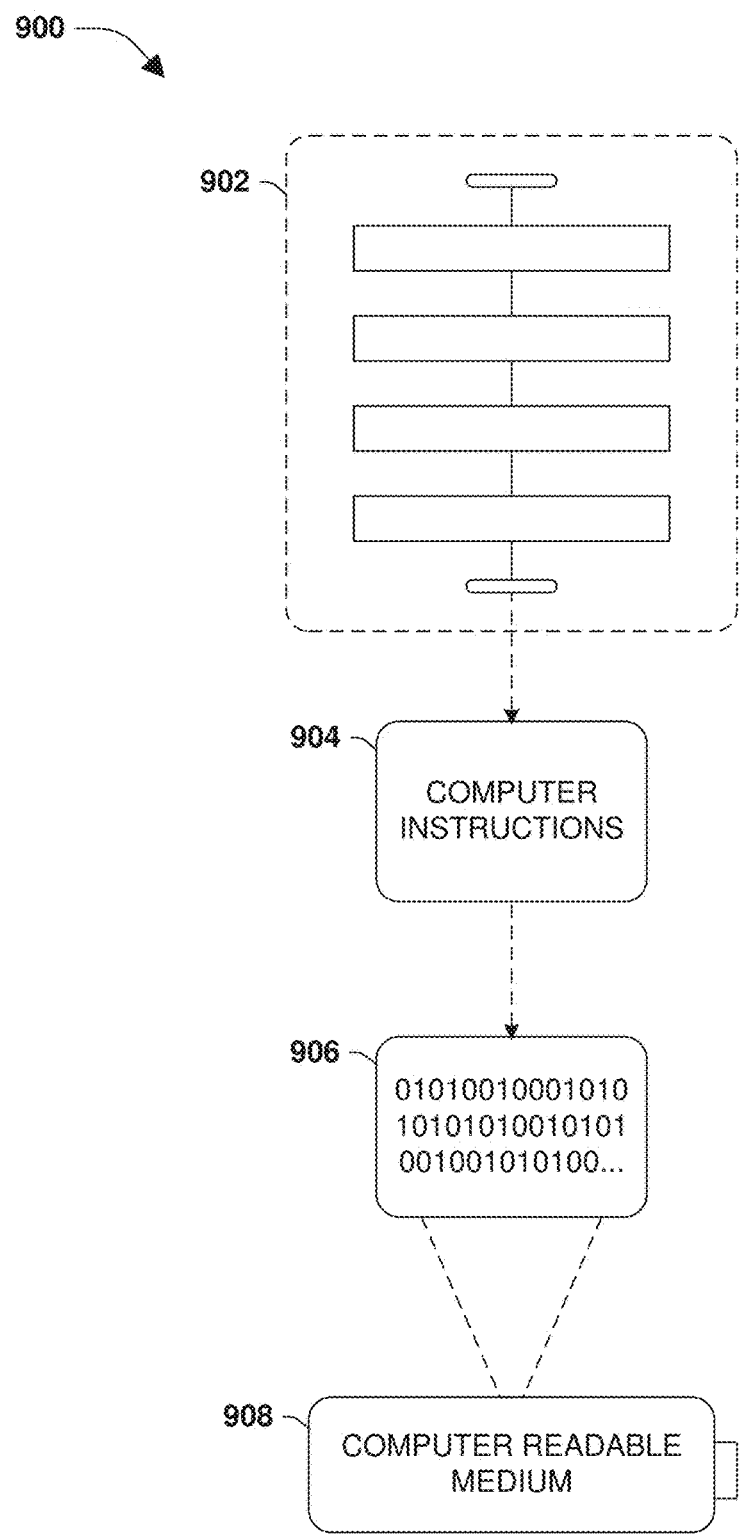
FIG. 9 is an example of a computer readable medium in accordance with various embodiments of the present technology.

FIG. 9 is an example of a computer readable medium 900 in which various embodiments of the present technology may be implemented. An example embodiment of a computer-readable medium or a computer-readable device that is devised in these ways is illustrated in FIG. 9, wherein the implementation comprises a computer-readable medium 908, such as a compact disc-recordable (CD-R), a digital versatile disc-recordable (DVD-R), flash drive, a platter of a hard disk drive, etc., on which is encoded computer-readable data 906. The computer-readable data 906, such as binary data comprising at least one of a zero or a one, in turn comprises processor-executable computer instructions 904 configured to operate according to one or more of the principles set forth herein. In some embodiments, the processor-executable computer instructions 904 are configured to perform at least some of the exemplary methods 902 disclosed herein, such as method 200 of FIGS. 2A and 2B, for example. In some embodiments, the processor-executable computer instructions 904 are configured to implement a system, such as at least some of the exemplary systems disclosed herein, such as system 100 of FIG. 1, system 300 of FIGS. 3A-3C, and/or system 700 of FIG. 7, for example. Many such computer-readable media are contemplated to operate in accordance with the techniques presented herein.

In some embodiments, the described methods and/or their equivalents may be implemented with computer executable instructions. Thus, in some embodiments, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (Saas) architecture, a smart phone, and so on. In some embodiments, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM) s, CD-Rs, compact disk re-writeable (CD-RW) s, DVDs, magnetic tape, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    probing a database to determine a density of event records occurring over a fraction of a time period of event records to evaluate;
    extrapolating the density of event records to generate an extrapolated count of event records over the time period;
    in response to the extrapolated count exceeding a threshold, triggering a sampling procedure comprising:
        assigning random numbers for blocks storing groups of event records over the time period; and
        for each block assigned a random number:
            in response to the random number assigned to a block exceeding a sampling threshold, sampling event records within the block as sampled event records, otherwise, refraining from sampling the event records; and
    generating an evaluation output based upon the sampled event records sampled by the sampling procedure.

2. The method of claim 1, wherein the generating comprises:
    evaluating file system events described by the sampled event records to identify access patterns of users accessing data of a computing system; and
    providing the access patterns as the evaluation output through a user interface.

3. The method of claim 2, wherein the generating comprises:
    executing machine learning functionality upon the access patterns to identify an anomaly corresponding to a malicious action within the computing system; and
    generating the evaluation output to include a notification of the malicious action.

4. The method of claim 1, comprising:
    generating the random numbers within memory without accessing disk storage.

5. The method of claim 1, comprising:
    determining a filtered count associated with a number of sampled event records; and
    in response to the filtered count falling below a disable sampling threshold, disabling the sampling procedure, wherein the disable sampling threshold is set based upon an accuracy metric for the evaluation output.

6. The method of claim 1, comprising:
    generating a query for selecting columns within a database storing the event records, wherein the query is generated with record selection filters and a random number generation function for sampling the event records; and
    executing the query against the database to retrieve the sampled event records.

7. The method of claim 1, comprising:
    determining a percentage of the event records to sample based upon the extrapolated count; and setting an optimum dataset size sampling parameter as the threshold for determining an amount of sampling to perform based upon the percentage.

8. The method of claim 1, comprising:
receiving a filter to apply for the event records; and
applying the filter before applying sampling parameters used to control the sampling procedure.

9. The method of claim 1, comprising:
dynamically applying filters for the event records as part of executing the sampling procedure.

10. A computing device, comprising:
a memory comprising machine executable code; and
a processor coupled to the memory, the processor configured to execute the machine executable code to cause the machine to perform operations comprising:
probing a database to determine a density of event records occurring over a fraction of a time period of event records to evaluate;
extrapolating the density of event records to generate an extrapolated count of event records over the time period;
in response to the extrapolated count exceeding a threshold, triggering a sampling procedure comprising:
assigning random numbers for blocks storing groups of event records over the time period; and
for each block assigned a random number:
in response to the random number assigned to a block exceeding a sampling threshold, sampling event records within the block as sampled event records, otherwise, refraining from sampling the event records; and
generating an evaluation output based upon the sampled event records sampled by the sampling procedure.

11. The computing device of claim 10, wherein the operations comprise:
defining a sampling max records per day sampling parameter; and
utilizing the sampling max records per day sampling parameter to determine when to enable the sampling procedure.

12. The computing device of claim 10, wherein the operations comprise:
defining a sampling base denominator sampling parameter; and
utilizing the sampling base denominator sampling parameter as a multiplier factor to determine a sampling number of event records to sample by the sampling procedure.

13. The computing device of claim 10, wherein the operations comprise:
defining a sampling denominator maximum limit sampling parameter; and
utilizing the sampling denominator maximum limit sampling parameter to limit a sampling number of event records to sample by the sampling procedure.

14. The computing device of claim 10, wherein the operations comprise:
defining a sampling maximum days sampling parameter; and
in response to a request time-range duration specifying the time period being greater than or equal to the sampling maximum days sampling parameter, enabling the sampling procedure, otherwise, disabling the sampling procedure.

15. The computing device of claim 10, wherein the operations comprise:
defining a sampling for filters sampling parameter; and
in response to the sampling for filters sampling parameter being set to true and receiving a request with a filter for processing the event records, enabling the sampling procedure, otherwise, disabling the sampling procedure.

16. The computing device of claim 10, wherein the operations comprise:
defining a sampling for filters sampling parameter; and
in response to the sampling for filters sampling parameter being set to false and receiving a request with a filter for processing the event records, enabling the sampling procedure.

17. The computing device of claim 10, wherein the operations comprise:
defining a sampling for filters sampling parameter; and
in response to the sampling for filters sampling parameter being set to false and receiving a request without any filters for processing the event records, enabling the sampling procedure.

18. The computing device of claim 10, wherein the operations comprise:
defining a sampling minimum records total sampling parameter;
determining a count of event records after applying any filters specified for the event records to process; and
in response to the count of event records being greater than or equal to the sampling minimum records total sampling parameter, enabling the sampling procedure, otherwise, disabling the sampling procedure.

19. A non-transitory machine readable medium comprising instructions for performing a method, which when executed by a machine, causes the machine to perform operations comprising:
probing a database to determine a density of event records occurring over a fraction of a time period of event records to evaluate;
extrapolating the density of event records to generate an extrapolated count of event records over the time period;
in response to the extrapolated count exceeding a threshold, triggering a sampling procedure comprising:
assigning random numbers for blocks storing groups of event records over the time period; and
for each block assigned a random number:
in response to the random number assigned to a block exceeding a sampling threshold, sampling event records within the block as sampled event records, otherwise, refraining from sampling the event records; and
generating an evaluation output based upon the sampled event records sampled by the sampling procedure.

20. The non-transitory machine readable medium of claim 19, wherein the instructions cause the machine to:
populate a user interface with the evaluation output.

21. A system, comprising:
a memory comprising machine executable code;
a processor coupled to the memory;
means for probing a database to determine a density of event records occurring over a fraction of a time period of event records to evaluate;
means for extrapolating the density of event records to generate an extrapolated count of event records over the time period;

means for triggering a sampling procedure based upon the extrapolated count exceeding a threshold, wherein the sampling procedure comprises:
  assigning random numbers for blocks storing groups of event records over the time period; and
  for each block assigned a random number:
    in response to the random number assigned to a block exceeding a sampling threshold, sampling event records within the block as sampled event records, otherwise, refraining from sampling the event records; and
means for generating an evaluation output based upon the sampled event records sampled by the sampling procedure.

* * * * *